(12) United States Patent
Wang et al.

(10) Patent No.: US 10,317,708 B2
(45) Date of Patent: Jun. 11, 2019

(54) LIGHT-OPERATED ADJUSTABLE TERAHERTZ WAVE ATTENUATOR AND USE METHOD THEREOF

(71) Applicant: 38TH RESEARCH INSTITUTE, CHINA ELECTRONICS TECHNOLOGY GROUP CORPORATION, Anhui (CN)

(72) Inventors: Changlei Wang, Anhui (CN); Shuai Wu, Anhui (CN)

(73) Assignee: 38 RESEARCH INSTITUTE, CHINA ELECTRONICS TECHNOLOGY GROUP CORPORATION, Anhui (CN)

( * ) Notice: Subject to any disclaimer, the term of this patent is extended or adjusted under 35 U.S.C. 154(b) by 50 days.

(21) Appl. No.: 15/535,330

(22) PCT Filed: Dec. 8, 2015

(86) PCT No.: PCT/CN2015/096605
§ 371 (c)(1),
(2) Date: Jun. 12, 2017

(87) PCT Pub. No.: WO2016/095719
PCT Pub. Date: Jun. 23, 2016

(65) Prior Publication Data
US 2017/0322431 A1    Nov. 9, 2017

(30) Foreign Application Priority Data

Dec. 17, 2014    (CN) .......................... 2014 1 0790152

(51) Int. Cl.
*G02F 1/01*    (2006.01)
(52) U.S. Cl.
CPC ........ *G02F 1/0126* (2013.01); *G02F 2203/13* (2013.01); *G02F 2203/48* (2013.01)

(58) Field of Classification Search
CPC ...... G02F 1/0126; G02F 1/01; G02F 2203/13; G02F 2203/48
See application file for complete search history.

(56) References Cited

U.S. PATENT DOCUMENTS 3,490,827 A * 1/1970 Snitzer .................... B29C 51/26
359/30
6,111,416 A * 8/2000 Zhang ................ G01N 21/3581
324/244.1
(Continued)

FOREIGN PATENT DOCUMENTS

CN    101950092 A    1/2011
CN    102109686 A    6/2011
(Continued)

*Primary Examiner* — John R Lee
(74) *Attorney, Agent, or Firm* — Muncy, Geissler, Olds & Lowe, P.C.

(57) ABSTRACT

The present invention discloses a light-operated adjustable terahertz wave attenuator. The attenuator includes a silicon base-silicon base-vanadium oxide thin film, a laser emitter and a spherical collimating lens, wherein the silicon based-vanadium dioxide thin film is vertical to a terahertz beam direction, the laser emitter is arranged on one side of the silicon based-vanadium dioxide thin film, the laser emitter is connected with the collimator, the laser emitted from the laser emitter is emitted from the collimator and irradiates on a film surface of the silicon based-vanadium oxide thin film, and the spots of the laser irradiating on the film surface of the silicon based-vanadium oxide thin film completely cover the transmitted terahertz wave spots. The present invention further discloses a use method of the light-operated adjustable terahertz wave attenuator.

8 Claims, 1 Drawing Sheet

(56) References Cited

U.S. PATENT DOCUMENTS

| | | | | |
|---|---|---|---|---|
| 7,531,802 B2* | 5/2009 | Zhang | ............ | G01J 3/02 |
| | | | | 250/341.1 |
| 9,658,510 B2* | 5/2017 | Kippelen | ............ | G02F 1/0126 |
| 2006/0067610 A1* | 3/2006 | Wu | ............ | G02F 1/31 |
| | | | | 385/16 |
| 2011/0114856 A1 | 5/2011 | Cooke | | |
| 2011/0169944 A1* | 7/2011 | Zhao | ............ | G01N 21/8806 |
| | | | | 348/126 |
| 2011/0234744 A1* | 9/2011 | Fujita | ............ | B82Y 20/00 |
| | | | | 347/248 |
| 2011/0249690 A1* | 10/2011 | Sato | ............ | H01S 5/141 |
| | | | | 372/20 |
| 2013/0286397 A1* | 10/2013 | Witinski | ............ | G01J 3/42 |
| | | | | 356/409 |
| 2014/0010251 A1* | 1/2014 | Zayer | ............ | H01S 5/143 |
| | | | | 372/20 |
| 2017/0299434 A1* | 10/2017 | Hu | ............ | G01J 3/0237 |
| 2017/0322431 A1* | 11/2017 | Wang | ............ | G02F 1/0126 |
| 2017/0329127 A1* | 11/2017 | Liu | ............ | G02B 26/0816 |

FOREIGN PATENT DOCUMENTS

| | | |
|---|---|---|
| CN | 103247839 A | 8/2013 |
| CN | 104407453 A | 3/2015 |
| CN | 104460050 A | 3/2015 |
| CN | 204256321 U | 4/2015 |

\* cited by examiner

LIGHT-OPERATED ADJUSTABLE TERAHERTZ WAVE ATTENUATOR AND USE METHOD THEREOF

FIELD OF THE INVENTION

The present invention belongs to the technical field of terahertz wave applications, and in particular to a light-operated adjustable terahertz wave attenuator and a use method thereof.

BACKGROUND OF THE INVENTION

A terahertz wave refers to electromagnetic wave radiation with a frequency band of 0.1-10 THz, and its electromagnetic wave spectrum is located between microwave and infrared bands. Therefore, a terahertz system takes into account the advantages of electronic and optical systems. After the development in recent years, the terahertz technology is gradually developed to nondestructive testing, security inspection, medicine, radar, communication, astronomy and other application fields.

At present, research on terahertz waves at home and abroad mainly focuses on the application of the terahertz wave technology, terahertz spectrum analysis and other fields, for example, research on optical properties of an ultra-thin metal film at a terahertz band, application of a terahertz band metamaterial in biosensing, application and research of the terahertz technology in a medical test box diagnosis, and so on. However, the evaluation, research, adjustment and correction of a terahertz wave system and other terahertz wave attenuators are rarely reported. At present, the adjustable terahertz wave attenuation devices used at home and abroad have very complex structures and are inconvenient to be compatible with other terahertz equipment.

SUMMARY OF THE INVENTION

The technical problem to be solved by the present invention is to provide a light-operated adjustable terahertz wave attenuator which is simple in structure, small in size and easy to integrate, and a use method thereof.

The present invention achieves the above-mentioned technical problem by the following technical means: a light-operated adjustable terahertz wave attenuator includes a silicon base-vanadium oxide thin film (1), a laser emitter (2) and a spherical collimating lens (3), wherein the silicon based-vanadium oxide thin film (1) is normal to a terahertz beam direction, the laser emitter (2) is arranged on one side of the silicon based-vanadium oxide thin film (1), the laser emitter (2) is connected with the spherical collimating lens (3), the laser emitted from the laser emitter (2) is emitted from the spherical collimating lens (3) and irradiates on a film surface of the silicon based-vanadium oxide thin film (1), and the spots of the laser irradiating on the film surface of the silicon based-vanadium oxide thin film (1) completely cover the transmitted terahertz wave spots. As an optimal technical solution, an included angle formed by the laser emitter (2) and the normal direction of the film surface of the silicon based-vanadium oxide thin film (1) is within a range of 20°-35°.

As an optimal technical solution, the included angle formed by the laser emitter (2) and the normal direction of the film surface of the silicon based-vanadium oxide thin film (1) is 30°.

As an optimal technical solution, the substrate of the silicon based-vanadium oxide thin film (1) is high-resistance silicon, and the thickness of the thin film is 50-800 nm.

As an optimal technical solution, the laser emitter (2) is a continuous laser or a pulse laser or a laser diode.

As an optimal technical solution, the working wavelength of the laser emitter (2) is within a range of 400-1550 nm, and the output light power is continuously adjustable between 0-2 W.

As an optimal technical solution, the light-operated adjustable terahertz wave attenuator further includes a laser absorber (4), and the laser absorber (4) is arranged on a laser reflection path for shielding and absorbing reflected laser.

As an optimal technical solution, the laser absorber (4) is a black metal plate or a laser attenuation piece.

The present invention further provides a use method of the light-operated adjustable terahertz wave attenuator in any one of the solutions mentioned above. The silicon based-vanadium oxide thin film (1) is adjusted to generate a semiconductor-metal phase transition process by controlling the emission light power of the laser emitter (2), so that the absorptivity of the silicon based-vanadium oxide thin film (1) to the terahertz waves changes, and the decrements of the terahertz waves are adjusted.

The present invention has the advantages as follows: compared with the existing attenuator, the light-operated adjustable terahertz wave attenuator of the present invention has the advantages of being simple in structure, convenient to assemble, easy to integrate with all kinds of existing terahertz emission sources, high in attenuation adjustment speed, easy to control and the like, and the application of terahertz in imaging, medical diagnosis, security inspection, information communication, space astronomy and other technical fields can be satisfied.

DETAILED DESCRIPTION OF THE EMBODIMENTS

The present invention will be described below in detail in combination with the drawings.

Figure 1:
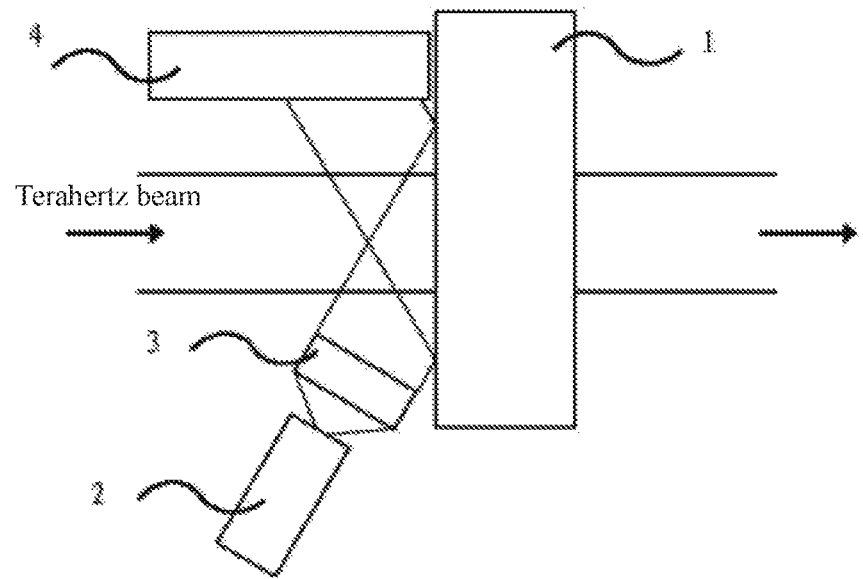
FIG. 1 is a structural schematic diagram of a light-operated adjustable terahertz wave attenuator provided by an embodiment of the present invention.

As shown in FIG. 1, the embodiment of the present invention provides a light-operated adjustable terahertz wave attenuator, including a silicon base-vanadium oxide thin film 1, a laser emitter 2, a spherical collimating lens 3 and a laser absorber 4.

The laser emitter 2 is connected with the spherical collimating lens 3, the laser emitted from the laser emitter 2 is emitted from the spherical collimating lens 3 and irradiates the silicon based-vanadium oxide thin film 1, an included angle of a laser emission direction of the laser emitter 2 and the normal direction of a film surface of the silicon based-vanadium oxide thin film 1 is 30°, moreover the spots of the laser irradiating on the film surface of the silicon based-vanadium oxide thin film 1 can be guaranteed to completely cover the transmitted terahertz wave spots, and the laser absorber 4 is arranged on a laser reflection light path.

The use method of the light-operated adjustable terahertz wave attenuator is as follows: the light-operated adjustable terahertz wave attenuator is placed in terahertz waves, the terahertz waves vertically penetrate through the silicon based-vanadium oxide thin film 1, and the projections of the terahertz wave spots on the silicon based-vanadium oxide thin film 1 can be completely covered by the projection spots of laser beams emitted by the laser emitter 2 on the silicon based-vanadium oxide thin film 3. When no laser is emitted from the laser emitter 2, the silicon based-vanadium oxide thin film 1 does not absorb the terahertz waves, which is expressed as fixed insertion loss, when laser is emitted from the laser emitter 2, semiconductor-metal phase transition occurs on an area irradiated by the laser of the silicon based-vanadium oxide thin film 1, free electrons are generated in the thin film to absorb the penetrating terahertz waves so as to achieve an attenuation function of the terahertz waves.

The higher the output light power of the laser emitter 2 is, the higher the concentration of the free electrons in the silicon based-vanadium oxide thin film 1 is, the stronger the absorption of the terahertz waves is, and the attenuation characteristics of the terahertz waves are adjusted by controlling the output light power of the laser emitter 2. On the laser reflection light path, the laser absorber 4 shields and absorbs the reflected laser so as to avoid harm to human eyes.

Figure 2:
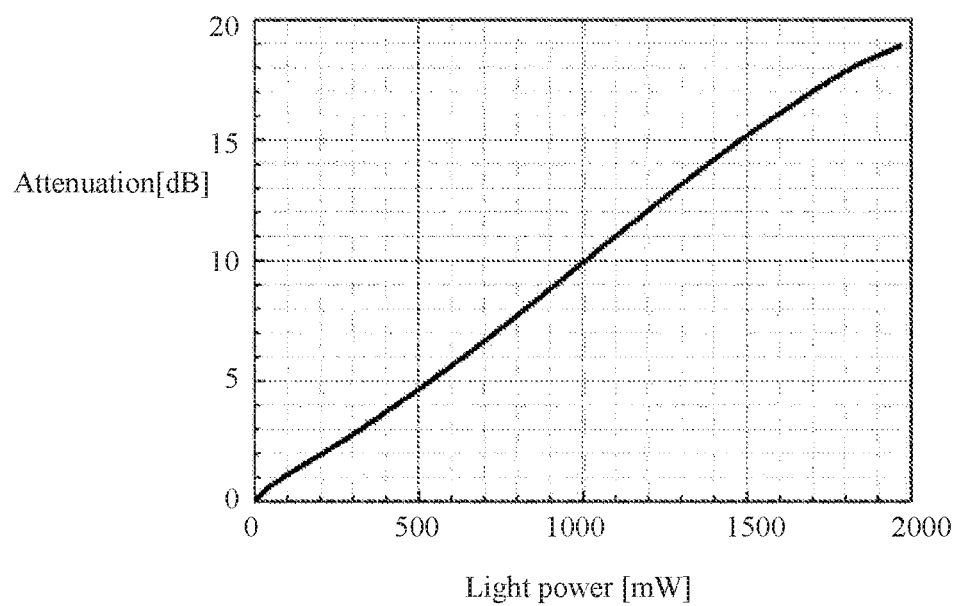
FIG. 2 is an attenuation-light power response curve of a light-operated adjustable terahertz wave attenuator provided by an embodiment of the present invention.

FIG. 2 is an attenuation-light power response curve of the above-mentioned embodiment. As shown in the figure, the attenuation of the terahertz waves can be adjusted within a range of 0-19 dB by controlling the output light power of the laser emitter 2.

The embodiment is merely a preferred embodiment of the present invention and is not intended to limit the present invention, and any modifications, equivalent substitutions, improvements and the like made within the spirit and principle of the present invention shall all fall within the protection scope of the present invention.

INDUSTRIAL APPLICABILITY

The light-operated adjustable terahertz wave attenuator and the use method thereof can be used in electronic systems or optical systems, and can be specifically used in nondestructive testing, security inspection, medical diagnosis, imaging, radar, communication, astronomy, and any possible technical solutions in accordance with the present invention may be manufactured or used industrially.

The invention claimed is:

1. A light-operated adjustable terahertz wave attenuator, comprising a silicon base-vanadium oxide thin film, a laser emitter having a continuously variable output light beam power and a spherical collimating lens, wherein the silicon based-vanadium oxide thin film is normal to a terahertz beam direction, the laser emitter is arranged on one side of the silicon based-vanadium oxide thin film, the laser emitter is connected with the spherical collimating lens, the laser emitted from the laser emitter is emitted from the spherical collimating lens and irradiates on a film surface of the silicon based-vanadium oxide thin film, and spots of the laser irradiating on the film surface of the silicon based-vanadium oxide thin film completely cover transmitted terahertz wave spots, whereby the terahertz beam is adjustably attenuated by varying the output light beam power.

2. The light-operated adjustable terahertz wave attenuator of claim 1, wherein an included angle formed by the laser emitter and a normal direction of the film surface of the silicon based-vanadium oxide thin film is within a range of 20°-35°.

3. The light-operated adjustable terahertz wave attenuator of claim 2, wherein the included angle formed by the laser emitter and the normal direction of the film surface of the silicon based-vanadium oxide thin film is 30°.

4. The light-operated adjustable terahertz wave attenuator of claim 1, wherein the substrate of the silicon based-vanadium oxide thin film is high-resistance silicon, and the thickness of the thin film is 50-800 nm.

5. The light-operated adjustable terahertz wave attenuator of claim 1, wherein the laser emitter is a continuous laser or a pulse laser or a laser diode.

6. The light-operated adjustable terahertz wave attenuator of claim 5, wherein a working wavelength of the laser emitter is within a range of 400-1550 nm, and the output light beam power is continuously adjustable between 0-2 W.

7. The light-operated adjustable terahertz wave attenuator of claim 1, further comprising a laser absorber, wherein the laser absorber is arranged on a path of a laser reflection from the thin film for shielding and absorbing the laser reflection.

8. The light-operated adjustable terahertz wave attenuator of claim 7, wherein the laser absorber is a black metal plate or a laser attenuation piece.

* * * * *